US011631916B2

(12) United States Patent  
Kume et al.

(10) Patent No.: US 11,631,916 B2  
(45) Date of Patent: Apr. 18, 2023

(54) BATTERY PACK

(71) Applicant: Panasonic Intellectual Property Management Co., Ltd., Osaka (JP)

(72) Inventors: Shingo Kume, Osaka (JP); Toshiya Gotou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/638,578

(22) PCT Filed: Aug. 7, 2018

(86) PCT No.: PCT/JP2018/029503  
§ 371 (c)(1),  
(2) Date: Feb. 12, 2020

(87) PCT Pub. No.: WO2019/039260  
PCT Pub. Date: Feb. 28, 2019

(65) Prior Publication Data  
US 2020/0220130 A1  Jul. 9, 2020

(30) Foreign Application Priority Data  
Aug. 24, 2017 (JP) .............................. JP2017-161546

(51) Int. Cl.  
*H01M 50/20* (2021.01)  
*H01M 50/35* (2021.01)  
(Continued)

(52) U.S. Cl.  
CPC ......... *H01M 50/20* (2021.01); *H01M 10/613* (2015.04); *H01M 10/625* (2015.04);  
(Continued)

(58) Field of Classification Search  
None  
See application file for complete search history.

(56) References Cited

U.S. PATENT DOCUMENTS

| | | | |
|---|---|---|---|
| 4,317,497 A * | 3/1982 | Alt ........................ | H01M 50/20 180/68.5 |
| 2012/0040223 A1* | 2/2012 | Odumodu ......... | H01M 10/6557 429/120 |
| 2012/0129024 A1* | 5/2012 | Marchio ............... | H01M 10/48 429/87 |

FOREIGN PATENT DOCUMENTS

| | | |
|---|---|---|
| CN | 106898711 A | 6/2017 |
| JP | 9-240288 | 9/1997 |

(Continued)

OTHER PUBLICATIONS

International Search Report of PCT application No. PCT/JP2018/029503 dated Oct. 23, 2018.

(Continued)

*Primary Examiner* — Lisa S Park  
(74) *Attorney, Agent, or Firm* — McDermott Will & Emery LLP

(57) ABSTRACT

A battery pack includes: a battery stack; a housing that houses the battery stack; and a skeleton part that is housed in the housing and reinforces the housing. The skeleton part includes a stem extending in a first direction, a plurality of branch portions that protrude from the stem and are arranged in a row in the first direction, and a plurality of housing spaces, each of the housing spaces being defined by a pair of branch portions disposed adjacently to each other and housing the battery stack. The stem and the plurality of branch portions are fixed to the housing.

8 Claims, 3 Drawing Sheets

(51) Int. Cl.
  *H01M 50/209* (2021.01)
  *H01M 50/271* (2021.01)
  *H01M 10/625* (2014.01)
  *H01M 10/6552* (2014.01)
  *H01M 10/6556* (2014.01)
  *H01M 10/6568* (2014.01)
  *H01M 10/647* (2014.01)
  *H01M 10/6554* (2014.01)
  *H01M 10/613* (2014.01)

(52) U.S. Cl.
  CPC ... *H01M 10/6552* (2015.04); *H01M 10/6556* (2015.04); *H01M 10/6568* (2015.04); *H01M 50/35* (2021.01); *H01M 2220/20* (2013.01)

(56) References Cited

FOREIGN PATENT DOCUMENTS

JP      H09240288    *  9/1997
JP      2012-181972     9/2012

OTHER PUBLICATIONS

English Translation of Chinese Office Action dated Jan. 19, 2023 for the related Chinese Patent Application No. 201880052985.9.

\* cited by examiner

BATTERY PACK

CROSS-REFERENCE TO RELATED APPLICATIONS

This application is a U.S. national stage application of the PCT International Application No. PCT/JP2018/029503 filed on Aug. 7, 2018, which claims the benefit of foreign priority of Japanese patent application 2017-161546 filed on Aug. 24, 2017, the contents all of which are incorporated herein by reference.

TECHNICAL FIELD

The present invention relates to a battery pack.

BACKGROUND ART

For example, as a power source for a vehicle and the like which requires a high output voltage, there has been known a battery stack formed by connecting a plurality of batteries to each other in series (for example, see Patent Literature 1). In general, the battery stack has a module structure formed by stacking a predetermined number of batteries and by fastening the stacked batteries using a bind bar. Further, the plurality of battery stacks are housed in a battery pack.

CITATION LIST

Patent Literature

PTL 1: Unexamined Japanese Patent Publication No. 2012-181972

SUMMARY OF THE INVENTION

The inventors of the present invention have intensively studied with respect to a conventional battery pack and, as a result, have arrived at a novel technique for housing the battery stack.

The present invention has been made in view of such a circumference, and it is an object of the present invention to provide a novel technique for housing a battery stack.

An aspect of the present invention is a battery pack. The battery pack includes: a battery stack including a plurality of stacked batteries; a housing that houses the battery stack; and a skeleton part that is housed in the housing and reinforces the housing. The skeleton part has: a stem extending in a first direction; a plurality of branch portions protruding from the stem and being arranged in a row in the first direction; and a plurality of housing spaces, each of the housing spaces being defined by a pair of branch portions disposed adjacently to each other and housing the battery stack, and the stem and the plurality of branch portions are fixed to the housing.

According to the present invention, it is possible to provide a novel technique for housing battery stacks.

DESCRIPTION OF EMBODIMENT

Figure 1:
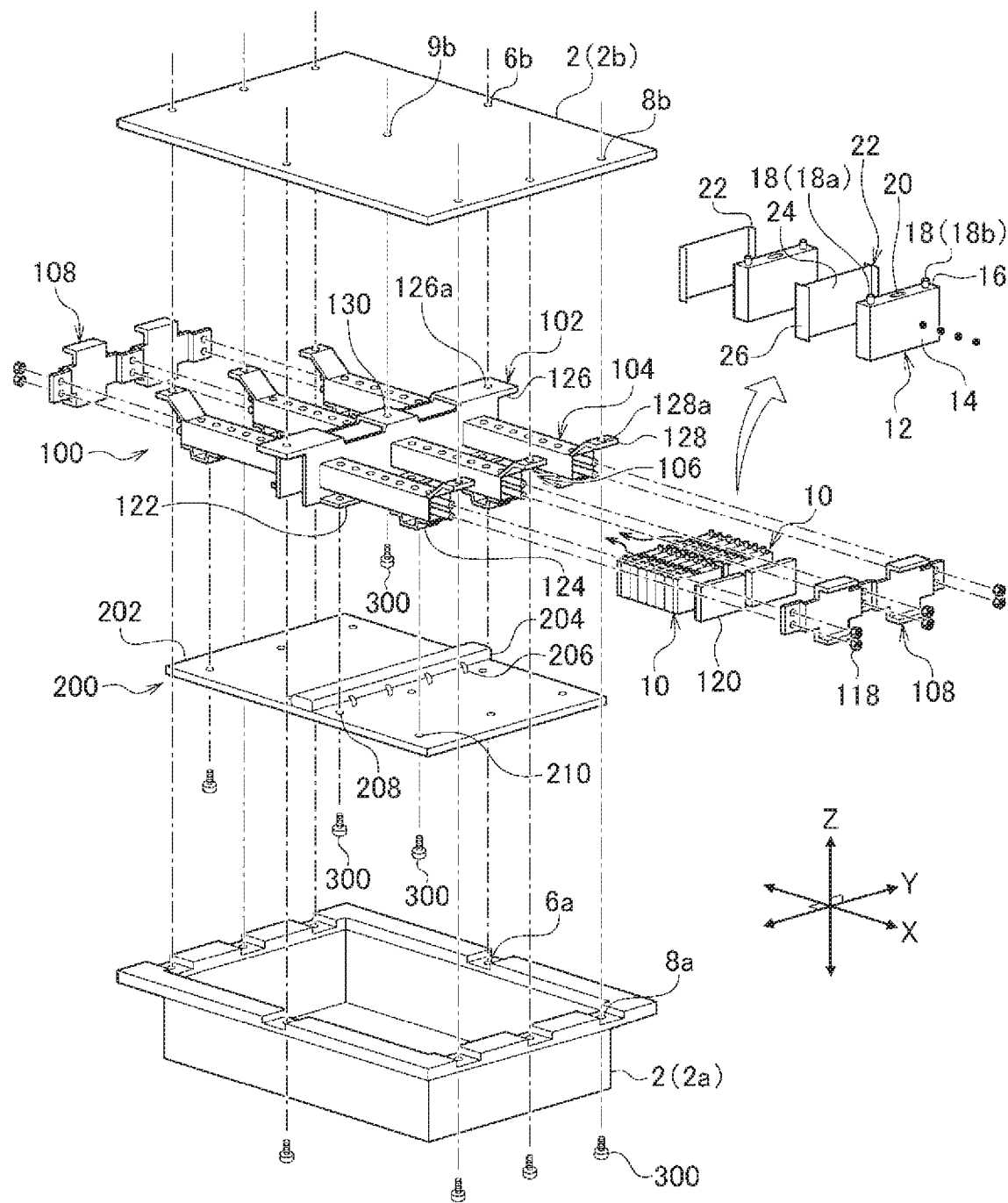
FIG. 1 is an exploded perspective view showing a schematic structure of a battery pack according to an exemplary embodiment.

Hereinafter, the present invention will be described based on preferred exemplary embodiment with reference to the drawings. The exemplary embodiment is an exemplification and does not limit the invention. All features described in the exemplary embodiment and combinations of the features are not necessarily essential to the invention. The same reference marks are assigned to the same or equivalent configuration elements, members, and processes illustrated in the drawings. Explanation for the same or equivalent configuration elements, members, and processes will not be repeated as appropriate. For convenience, scales or shapes of portions illustrated in the drawings are determined to facilitate explanation of the portions. The scales or shapes of portions should not be interpreted as limitation unless otherwise mentioned. Even the same members in different drawings may slightly differ from each other in scale or the like. Further, terms "first", "second", and the like, when used in the present description and claims, do not mean any order or importance unless otherwise mentioned, but are intended to distinguish between one configuration and another configuration.

Figure 2:
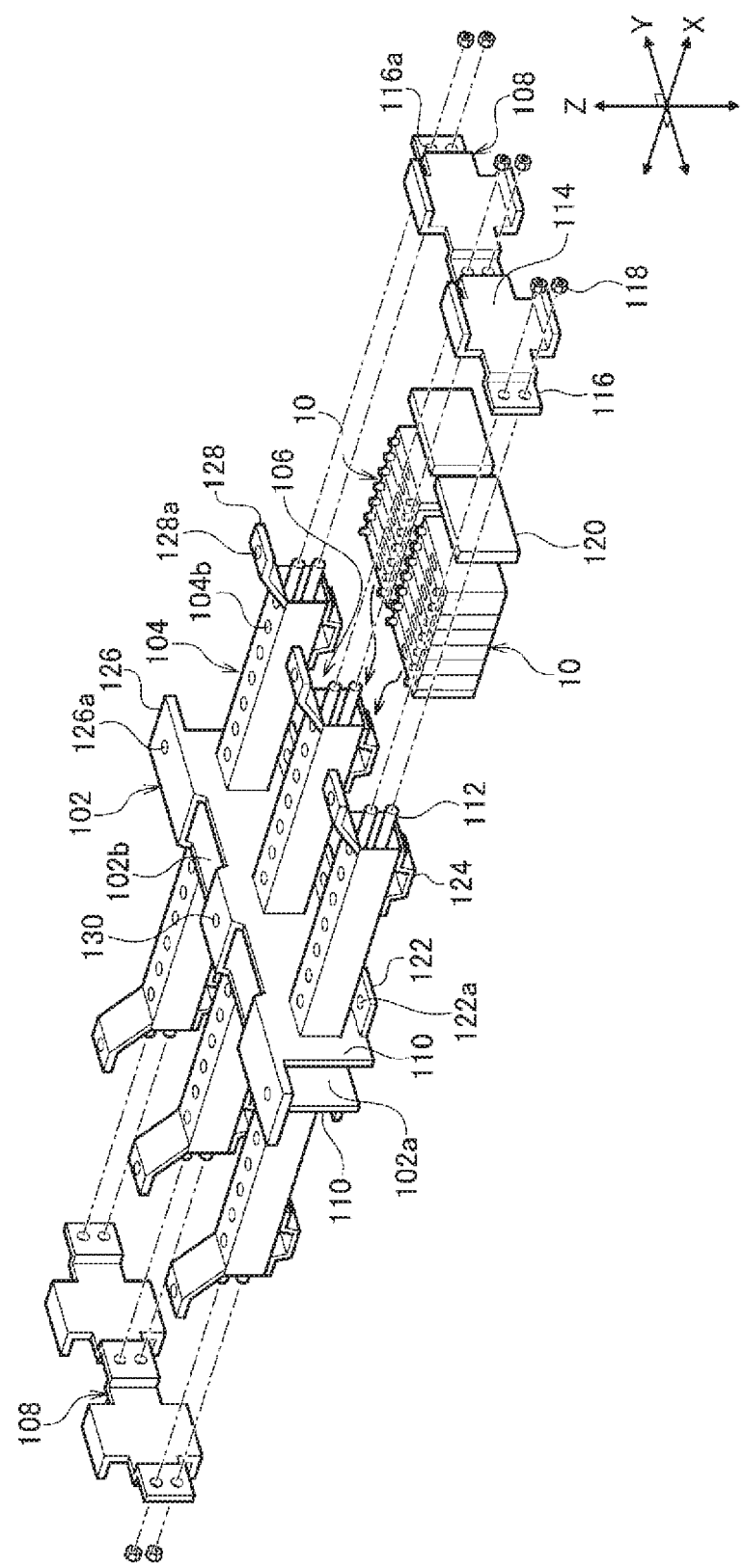
FIG. 2 is an exploded perspective view showing a schematic structure of a skeleton part and battery stacks.
Figure 3A:
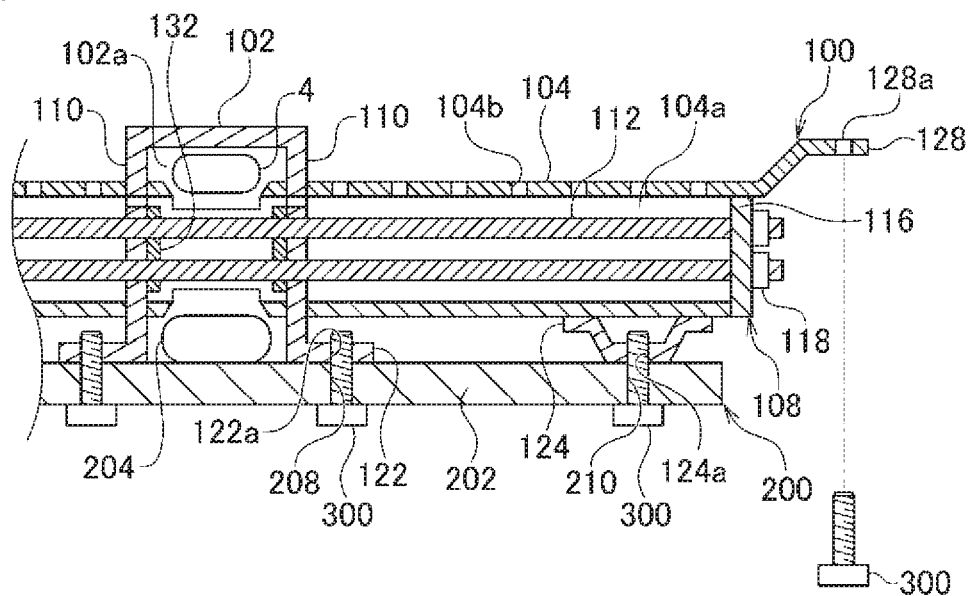
FIG. 3A is a cross-sectional view showing a portion of the skeleton part in an enlarged manner.
Figure 3B:
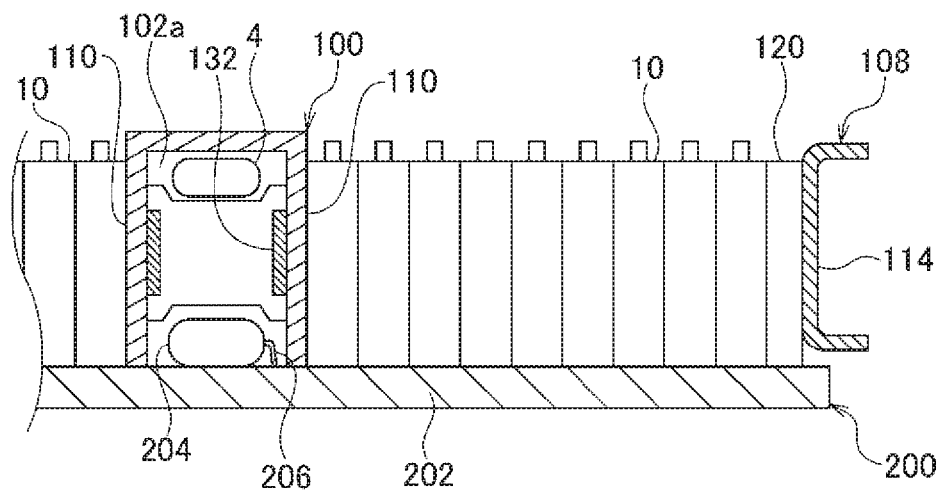
FIG. 3B is a cross-sectional view showing a portion of the skeleton part and the battery stack in an enlarged manner.

FIG. 1 is an exploded perspective view showing a schematic structure of a battery pack according to an exemplary embodiment. FIG. 2 is an exploded perspective view showing a schematic structure of a skeleton part and battery stacks. FIG.3A is a cross-sectional view showing a portion of the skeleton part in an enlarged manner. FIG. 3B is a cross-sectional view showing a portion of the skeleton part and the battery stack in an enlarged manner. In FIG. 1 and FIG. 2, the battery stacks are shown in a more enlarged manner than other portions. In FIG. 3B, illustration of an internal structure of a battery is omitted.

Battery pack 1 includes: housing 2; battery stacks 10; skeleton part 100; and cooling part 200. Housing 2 is a container which houses battery stacks 10, skeleton part 100, and cooling part 200. Preferably, housing 2 has waterproof property. Housing 2 does not necessarily have waterproof property. Housing 2 includes: container portion 2a having an opening; and lid portion 2b which closes the opening of container portion 2a. Container portion 2a has: a bottom plate; and side walls which are raised from the periphery of the bottom plate. Skeleton part 100 on which battery stacks 10 and cooling part 200 are mounted is fixed to housing 2. Housing 2 is fixed to an object on which housing 2 is to be mounted such as a vehicle body (not shown in the drawings). The fixing structure of each part is described in detail later.

Battery stack 10 has a plurality of stacked batteries 12. Each battery 12 is a chargeable secondary battery such as a lithium ion battery, a nickel metal hydride battery, or a nickel-cadmium battery. Battery 12 is a so-called rectangular (=prismatic) battery, and has exterior can 14 having a flat rectangular parallelepiped shape. Exterior can 14 has a substantially rectangular opening not shown in the drawings on one surface of exterior can 14, and an electrode assembly, an electrolyte and the like are housed in exterior can 14 through the opening. On the opening of exterior can 14, sealing plate 16 for sealing exterior can 14 is mounted.

On sealing plate 16, output terminal 18 of a positive electrode is mounted close to one end of sealing plate 16 in a longitudinal direction, and output terminal 18 of a negative electrode is mounted close to the other end of sealing plate 16 in the longitudinal direction. Hereinafter, output terminal 18 of a positive electrode is referred to as positive-electrode terminal 18a, and output terminal 18 of a negative electrode is referred to as negative-electrode terminal 18b as appropriate. When there is no need to distinguish polarities of output terminals 18, positive-electrode terminal 18a and negative-electrode terminal 18b are collectively referred to as output terminals 18. Exterior can 14, sealing plate 16, and output terminals 18 are electric conductors and are made of metal, for example.

In this exemplary embodiment, a surface of battery 12 on a side where sealing plate 16 is provided is assumed as an upper surface of battery 12, and a surface of battery 12 on a side opposite to the upper surface is assumed as a bottom surface of battery 12. Further, battery 12 has two main surfaces connecting the upper surface and the bottom surface to each other. The main surfaces have the largest area among six surfaces of battery 12. Two remaining surfaces other than the upper surface, the bottom surface, and the two main surfaces form side surfaces of battery 12. An upper surface side of battery 12 is assumed as an upper surface of battery stack 10, and a bottom surface side of battery 12 is assumed as a bottom surface of battery stack 10. For the sake of convenience, the upper surface side of battery stack 10 is assumed as a vertically upward direction, and a bottom surface side of battery stack 10 is assumed as a vertically downward direction.

In sealing plate 16, safety valve 20 is disposed between a pair of output terminals 18. Safety valve 20 is configured to release an internal gas by opening when an internal pressure of exterior can 14 is increased to a predetermined value or more. A gas discharged from safety valve 20 of each battery 12 is discharged to an outside of housing 2 through a first exhaust duct and a second exhaust duct described later.

The plurality of batteries 12 are stacked to each other such that the main surfaces of neighboring batteries 12 opposedly face each other. The "stack" means an arrangement of a plurality of members in any one direction. Therefore, the stacking of batteries 12 also includes an arrangement of the plurality of batteries 12 in a horizontal direction. Further, respective batteries 12 are disposed such that output terminals 18 face in the same direction (for the sake of convenience herein, vertically upward direction). Two neighboring batteries 12 are stacked such that positive-electrode terminal 18a of one battery 12 and negative-electrode terminal 18b of the other battery 12 are disposed adjacently to each other. Positive-electrode terminal 18a and negative-electrode terminal 18b are electrically connected to each other via a bus bar not shown in the drawings. Output terminals 18 of the same polarity of two neighboring batteries 12 may be connected to each other via the bus bar.

Battery stack 10 also includes a plurality of separators 22. Separator 22 is made of a resin having an insulation property, for example. The plurality of batteries 12 and the plurality of separators 22 are stacked alternately. Separator 22 has flat surface portion 24 parallel to the main surfaces of battery 12, and wall portions 26 extending from end portions of flat surface portion 24 in stacking direction X of batteries 12 (a direction indicated by arrow X in FIG. 1).

Flat surface portion 24 extends between the oppositely facing main surfaces of two neighboring batteries 12. With such a configuration, exterior cans 14 of neighboring batteries 12 are insulated from each other. Flat surface portion 24 extends between battery 12 and end plate 108 described later, and between battery 12 and stem 102 described later respectively. With such a configuration, exterior can 14 of battery 12 and end plate 108 and stem 102 are respectively insulated from each other. The side surfaces of battery 12 are covered by wall portions 26. With such a configuration, battery 12 and branch portions 104 described later are insulated from each other. That is, due to the provision of separators 22, exterior cans 14 of neighboring batteries 12 are insulated from each other, and exterior cans 14 of batteries 12 and skeleton part 100 are insulated from each other.

Skeleton part 100 is a structural body housed in housing 2 and provided for reinforcing housing 2. Skeleton part 100 is made of a high-rigidity material, for example, metal such as iron or stainless. Skeleton part 100 has stem 102, a plurality of branch portions 104, a plurality of housing spaces 106, and end plates 108. Stem 102 is an elongated member, and extends in the first direction. The first direction is a direction intersecting with stacking direction X of the batteries.

Further, stem 102 has the hollow structure. Stem 102 of this exemplary embodiment basically has a rectangular pipe shape, and has a shape where one surface of stem 102 is removed over the whole region in the first direction. Accordingly, with respect to internal space 102a of stem 102, a part of a circumferential surface is opened. Stem 102 is disposed such that the opening portion faces toward cooling part 200. Accordingly, internal space 102a of stem 102 is closed by cooling part 200.

A member used for battery pack 1 is housed in internal space 102a of stem 102. In this exemplary embodiment, as one example, a bundle of wirings connected to respective batteries 12, that is, harness 4 is housed in internal space 102a. Refrigerant pipe 204 (described later) of cooling part 200 is housed in internal space 102a. Further, a gas discharged from batteries 12 is made to flow through a portion of internal space 102a. Accordingly, stem 102 constitutes an exhaust duct for a gas discharged from batteries 12. In this exemplary embodiment, an exhaust duct which stem 102 constitutes is assumed as a first exhaust duct. Preferably, a flow path of an exhaust gas and a space where harness 4 and refrigerant pipe 204 are extended are partitioned gas-tightly in internal space 102a.

In a surface of stem 102 which faces a side opposite to cooling part 200, opening portions 102b through which internal space 102a and the outside of stem 102 communicate with each other are formed. A member used for battery pack 1, for example, harness 4 is pulled into internal space 102a through opening portion 102b. Alternatively, harness 4 is routed around to the outside from internal space 102a through opening portion 102b. The flow path of exhaust gas is sealed gas-tightly with respect to opening portions 102b. Both end portions of stem 102 in the first direction are brought into contact with an inner wall of container portion 2a. Accordingly, both end portions of internal space 102a in the first direction are closed by the inner wall of container portion 2a. When necessary, an opening portion not shown in the drawings is formed in the inner wall of container portion 2a, and harness 4 and refrigerant pipe 204 extending in internal space 102a, the flow path of the exhaust gas and the like are routed around to the outside of housing 2 through the opening portion.

The plurality of branch portions 104 protrude from stem 102 and are arranged in a row in the first direction. To be more specific, respective branch portions 104 protrude from stem 102 in a second direction orthogonally intersecting with the first direction. Respective branch portions 104 are arranged in a row in the first direction at predetermined intervals. Further, a plurality of housing spaces 106 in each of which battery stacks 10 are housed are defined by the pair of neighboring branch portions 104. Accordingly, the plurality of housing spaces 106 are arranged in a row in the first direction. To be more specific, each housing space 106 is defined by the pair of branch portions 104, stem 102, and end plate 108.

In this exemplary embodiment, horizontal direction Y which orthogonally intersects with stacking direction X of batteries 12 is assumed as the first direction. Stacking direction X of batteries 12 is assumed as the second direction. The plurality of branch portions 104 protrude in stacking direction X from both of two side walls 110 of stem 102 arranged side by side in stacking direction X. Accordingly, on both sides of stem 102, the plurality of housing spaces 106 are arranged in a row in horizontal direction Y. A distance between branch portions 104 in horizontal direction Y is about twice as large as a length of battery stack 10 in horizontal direction Y. Accordingly, in each housing space 106, two battery stacks 10 are housed such that two battery stacks 10 are arranged adjacently to each other in horizontal direction Y. The distance between branch portions 104 in horizontal direction Y is not particularly limited provided that the distance is equal to or more than a size of one battery stack 10 in horizontal direction Y.

Further, branch portion 104 has the hollow structure. Branch portion 104 of this exemplary embodiment has a rectangular pipe shape. In internal space 104a of branch portion 104, rod members 112 extending in an extending direction of branch portion 104 are housed. Rod members 112 protrude to the outside of branch portion 104 at a distal end portion of branch portion 104. In this exemplary embodiment, two rod members 112 are housed. Further, each rod member 112 penetrates side walls 110 of stem 102, and extends from a distal end of branch portion 104 disposed on one side of stem 102 to a distal end of branch portion 104 disposed on the other side of stem 102. On each of inner side surfaces of side walls 110, that is, on each of surfaces of side walls 110 which opposedly face internal space 102a, reinforcing plate 132 is mounted. Rod members 112 penetrate reinforcing plates 132. By providing reinforcing plates 132, rigidity of stem 102, eventually, rigidity of skeleton part 100 can be enhanced.

Further, in branch portion 104, opening portions 104b through which internal space 104a and the outside of branch portion 104 communicate with each other are formed. In internal space 104a of branch portion 104, a gas discharged from batteries 12 is made to flow through opening portions 104b. Internal space 104a communicates with internal space 102a of stem 102, and an exhaust gas reaches internal space 102a through internal space 104a. Accordingly, branch portion 104 constitutes an exhaust duct for a gas discharged from batteries 12. In this exemplary embodiment, the exhaust duct which branch portion 104 constitutes is assumed as a second exhaust duct. The second exhaust duct has a function of introducing a gas discharged from batteries 12 to the first exhaust duct.

End plate 108 is connected to the plurality of branch portions 104. End plate 108 has a plurality of body portions 114 corresponding to the plurality of housing spaces 106, and connecting portion 116 which connects neighboring body portions 114 to each other. That is, end plate 108 has the structure where the plurality of body portions 114 are arranged in horizontal direction Y, and connecting portion 116 is disposed between neighboring body portions 114. Further, end plate 108 has connecting portions 116 on both outermost sides thereof. These connecting portions 116 are formed such that one end side of connecting portion 116 in horizontal direction Y is connected to body portion 114, and the other end side of connecting portion 116 in horizontal direction Y is formed as a free end.

Each body portion 114 has a shape where upper and lower ends of a flat plate are bent. Accordingly, each body portion 114 has a main surface which faces toward housing space 106. Each body portion 114 forms a part of an outer shell of housing space 106. Each connecting portion 116 has a flat plate shape, and has through holes 116a at positions corresponding to rod members 112. In through holes 116a of each connecting portion 116, rod members 112 are inserted respectively. Fastening members 118 are mounted on distal ends of respective rod members 112 which protrude from through holes 116a. With such a configuration, end plate 108 is fixed to rod members 112. End plate 108 is connected to the plurality of branch portions 104 and hence, battery stacks 10 housed in housing space 106 are pressed by body portions 114. Battery stacks 10 are pressed to side wall 110 of stem 102 at a predetermined pressure. That is, battery stacks 10 are sandwiched between end plate 108 and stem 102. With such a configuration, battery stacks 10 are fixed.

With respect to connecting portion 116, a size in a direction intersecting with stacking direction X and horizontal direction Y, in this exemplary embodiment, a size in vertical direction Z is set smaller than a size of body portion 114 in the same direction. Accordingly, end plate 108 has flexibility at connecting portions 116. With such a configuration, connecting portion 116 is deformable according to relative displacement of neighboring body portions 114. There may be a case where a size of battery stack 10 is changed attributed to expansion or the like of batteries 12. Particularly, there exists a tendency that the size of battery stack 10 greatly changes in stacking direction X of batteries 12. Accordingly, neighboring body portions 114 are relatively displaceable according to a change in size of battery stack 10 housed in each housing space 106. On the other hand, since connecting portion 116 is resiliently deformable, it is possible to absorb the relative displacement of neighboring body portions 114. As a result, it is possible to absorb a change in size of each battery stack 10.

Further, between battery stack 10 and body portion 114 of end plate 108, spacer 120 is disposed. Spacer 120 is a member for filling a gap in size between battery stack 10 and housing space 106 in stacking direction X. A pressure from end plate 108 is transferred to battery stack 10 by way of spacer 120. By providing spacer 120, battery stack 10 can be fixed with more certainty in stacking direction X. Further, a number of batteries 12 which form battery stack 10 can be set more freely. Preferably, spacer 120 has resiliency. With such a configuration, it is possible to absorb a change in size of battery stack 10 also by spacer 120. Spacer 120 may be disposed between battery stack 10 and stem 102.

Cooling part 200 is a mechanism for cooling battery stacks 10. Cooling part 200 has cooling plate 202, refrigerant pipe 204, and distribution pipes 206. Battery stacks 10 are placed on cooling plate 202. Accordingly, it is understood that cooling plate 202 forms a part of the outer shell of housing space 106. Cooling plate 202 has an outer size capable of being housed in container portion 2a. In cooling plate 202, a refrigerant flow path (not shown in the drawings) is disposed.

Refrigerant pipe 204 is a pipe for circulating a refrigerant between the outside of battery pack 1 and cooling plate 202. The refrigerant is water or ethylene glycol, for example. Distribution pipes 206 are pipes which connect refrigerant pipe 204 and a flow path in cooling plate 202 to each other. The refrigerant is supplied to the flow path in cooling plate 202 through distribution pipes 206 from refrigerant pipe 204, and flows through the flow path in cooling plate 202 and, thereafter, is recovered by refrigerant pipe 204 through distribution pipes 206. Respective battery stacks 10 are cooled by heat exchange between a refrigerant flowing through cooling plate 202 and respective battery stacks 10.

Cooling part 200 is disposed so as to overlap with skeleton part 100 in vertical direction Z and is fixed to skeleton part 100. Specifically, skeleton part 100 has a plurality of plate-like first support portions 122 which protrude from side walls 110 of stem 102. As one example, respective first support portions 122 are disposed at positions overlapping with respective branch portions 104 in vertical direction Z. Each first support portion 122 has through hole 122a. A plurality of first through holes 208 are formed in cooling plate 202. Respective first through holes 208 are formed at positions overlapping with respective through holes 122a in vertical direction Z in a state where skeleton part 100 and cooling part 200 are aligned with each other.

Skeleton part 100 also has second support portions 124 at distal ends of respective branch portions 104 on a bottom surface side of skeleton part 100. Each second support portion 124 has through hole 124a. A plurality of second through holes 210 are formed in cooling plate 202. Respective second through holes 210 are formed at positions overlapping with respective through holes 124a in vertical direction Z in a state where skeleton part 100 and cooling part 200 are aligned with each other. In a state where skeleton part 100 and cooling part 200 are aligned with each other, fastening members 300 are inserted into first through holes 208 and through holes 122a. Further, fastening members 300 are inserted into second through holes 210 and through holes 124a. With such a configuration, skeleton part 100 and cooling part 200 are fixed to each other. Skeleton part 100 and cooling part 200 may be fixed to each other by a fixing mechanism other than fastening members 300.

In a state where cooling part 200 is fixed to skeleton part 100, bottom surfaces of battery stacks 10 housed in housing spaces 106 are brought into contact with cooling plate 202. With such a configuration, positioning of battery stacks 10 in vertical direction Z is made. Further, in this exemplary embodiment, two battery stacks 10 are housed in each housing space 106 in a state where two battery stacks 10 are arranged adjacently to each other in horizontal direction Y. Accordingly, two battery stacks 10 are disposed such that one side surface of one battery stack 10 is in contact with one side surface of the other battery stack 10, each side surface being one of two side surfaces of each battery stack 10 extending in stacking direction X (two side surfaces being opposite in horizontal direction Y). The other side surfaces of respective battery stacks 10 are brought into contact with branch portions 104 respectively. With such a configuration, positioning of respective battery stacks 10 in horizontal direction Y is made.

Further, with respect to respective battery stacks 10, one side surface out of two side surfaces extending in horizontal direction Y (two side surfaces being opposite in stacking direction X) is brought into contact with side wall 110 of stem 102. The other side surface is brought into contact with end plate 108 with spacer 120 interposed between the other side surface and end plate 108. With such a configuration, positioning of respective battery stacks 10 in stacking direction X is made. Between batteries 12 of each battery stack 10, between one battery stack 10 and the other battery stack 10, between batteries 12 and branch portions 104, between batteries 12 and side walls 110, and between batteries and end plates 108, separators 22 are interposed respectively.

Skeleton part 100 is fixed to housing 2. With such a configuration, rigidity of housing 2 can be ensured. Specifically, skeleton part 100 has first eaves portions 126 which protrude in horizontal direction Y from both end portions of stem 102 respectively. Respective first eaves portions 126 function as fixing portions fixed to the side walls of container portion 2a. Each first eaves portion 126 has through hole 126a. A plurality of first through holes 6a are formed in container portion 2a. A plurality of first through holes 6b are formed in lid portion 2b. In a state where skeleton part 100 and container portion 2a and lid portion 2b are aligned with each other, respective first through holes 6a, 6b are formed at positions overlapping with respective through holes 126a in vertical direction Z.

Skeleton part 100 has second eaves portions 128 which protrude from distal ends of respective branch portions 104 in stacking direction X. Respective second eaves portions 128 function as fixing portions fixed to the side walls of container portion 2a. Each second eaves portion 128 has through hole 128a. A plurality of second through holes 8a are formed in container portion 2a. A plurality of second through holes 8b are formed in lid portion 2b. In a state where skeleton part 100 and container portion 2a and lid portion 2b are aligned with each other, respective second through holes 8a, 8b are formed at positions overlapping with respective through holes 128a in vertical direction Z.

Further, skeleton part 100 has through hole 130 at an approximately center portion of stem 102 in horizontal direction Y. Third through hole 9b is formed in lid portion 2b. In a state where skeleton part 100 and lid portion 2b are aligned with each other, third through hole 9b is formed at a position overlapping with through hole 130 in vertical direction Z.

In a state where skeleton part 100, container portion 2a, and lid portion 2b are aligned with each other in an overlapping manner in vertical direction Z, fastening members 300 are inserted into first through holes 6a, through holes 126a, and first through holes 6b. Fastening members 300 are inserted into second through holes 8a, through holes 128a, and second through holes 8b. Fastening member 300 is inserted into through hole 130 and third through hole 9b. With such a configuration, container portion 2a, skeleton part 100, and lid portion 2b are fixed to each other. In such a state, skeleton part 100, cooling part 200, and the plurality of battery stacks 10 are housed in housing 2. With respect to fastening members 300 which fix housing 2 and skeleton part 100 to each other, distal end portions of fastening members 300 protruding from housing 2 are also inserted also into an object on which battery pack 1 is to be mounted. With such a configuration, battery pack 1 can be fixed to the object on which battery pack 1 is to be mounted. Skeleton part 100 and housing 2 may be fixed to each other by a fixing mechanism other than fastening members 300.

As has been described above, battery pack 1 according to this exemplary embodiment includes battery stacks 10, housing 2 which houses battery stacks 10, and skeleton part 100 which reinforces housing 2. Skeleton part 100 includes: stem 102 extending in the first direction; the plurality of branch portions 104 which protrude from stem 102 and are arranged in a row in the first direction; and the plurality of housing spaces 106 each of which is defined by the pair of neighboring branch portions 104. Further, both ends of stem 102 are fixed to housing 2, and the end portions of the plurality of respective branch portions 104 are fixed to housing 2.

That is, in this exemplary embodiment, housing 2 can be reinforced by skeleton part 100 having stem 102 and the plurality of branch portions 104, and functions of positioning and fixing batteries 12 are also imparted to skeleton part 100. With such a configuration, compared to a case where a conventional battery stack having a module structure where stacked batteries are fastened to each other using a bind bar is housed in a housing, a number of parts can be reduced. Further, according to this exemplary embodiment, it is possible to arrange batteries in a different manner from a case where conventional battery stacks are disposed in a housing. Accordingly, it is possible to enhance a degree of freedom in arranging batteries. As a result, in mounting battery pack 1 on a vehicle or the like, it is possible to efficiently arrange battery pack 1. Further, rigidity of housing 2 is ensured by skeleton part 100. Accordingly, rigidity which container portion 2a and lid portion 2b are required to possess is small. Accordingly, a shape and a size of housing 2 can be easily changed.

Battery pack 1 has end plates 108 for fixing battery stacks 10. End plate 108 has a plurality of body portions 114 corresponding to the plurality of housing spaces 106, and connecting portion 116 which connects neighboring body portions 114 to each other. That is, end plate 108 has the structure where end plates corresponding to battery stacks 10 in respective housing spaces 106 are formed integrally with each other. With such a configuration, a number of parts of battery pack 1 can be reduced. Connecting portion 116 is deformable according to the relative displacement of body portions 114 disposed adjacently to connecting portion 116. With such a configuration, it is possible to absorb a change in size of each battery stack 10 individually.

However, end plates 108 may be omitted. In a case where end plates 108 are not used, the side walls of container portion 2a play a role of end plates 108. In this case, in a state where skeleton part 100 is disposed in container portion 2a, battery stacks 10 are disposed in housing space 106 which is surrounded by stem 102, the side wall of container portion 2a, and neighboring branch portions 104. Spacer 120 is disposed between battery stacks 10 and the side wall of container portion 2a and hence, battery stacks 10 are sandwiched between side wall 110 of stem 102 and the side wall of container portion 2a. With such a configuration, battery stacks 10 housed in housing space 106 are fixed in a state where battery stacks 10 are pressed at a predetermined pressure between stem 102 and container portion 2a.

In a case where the side wall of container portion 2a plays a role of end plate 108, rod members 112 may be omitted. When container portion 2a has sufficient rigidity, even when rod members 112 are not disposed, battery stacks 10 can be fixed between stem 102 and the side wall of container portion 2a with certainty. In the configuration where end plates 108 are not used, when rod members 112 are disposed, for example, through holes are formed in the side walls of container portion 2a. Distal ends of respective rod members 112 protrude from the through holes, and fastening members 118 are mounted on the distal ends of respective rod members 112 protruding from the through holes. With such a configuration, the plurality of branch portions 104 are connected to the side walls of container portion 2a. As a result, rigidity of housing 2 is further increased and hence, battery stacks 10 can be fixed between stem 102 and the side walls of container portion 2a with certainty.

Further, stem 102 has the hollow structure. In internal space 102a of stem 102, a member used for battery pack 1, for example, harness 4 is housed. With such a configuration, ease of handling of battery pack 1 such as operability at the time of installing battery pack 1 can be enhanced. Such a configuration can contribute to miniaturization of battery pack 1. Further, a part which is added along with addition of a function to battery pack 1 can be housed in internal space 102a. Accordingly, it is possible to easily impart multiple functions to battery pack 1.

Stem 102 constitutes an exhaust duct for a gas discharged from batteries 12. With such a configuration, compared to a case where an exhaust duct is additionally provided, battery pack 1 can be miniaturized. It is possible to omit a space required for installation of the exhaust duct and hence, such a configuration can contribute to more efficient arrangement of batteries 12. Further, branch portion 104 has the hollow structure. Internal space 104a of branch portion 104 constitutes an exhaust duct for a gas discharged from batteries 12. With such a configuration, battery pack 1 can be more miniaturized. Such a configuration can contribute to more efficient arrangement of batteries 12.

Further, branch portion 104 has rod members 112 in internal space 104a. Rod members 112 extend in the extending direction of branch portion 104. With such a configuration, rigidity of skeleton part 100, eventually, rigidity of housing 2 can be enhanced. End plate 108 is fixed to rod members 112. With such a configuration, skeleton part 100 can support battery stacks 10 of various sizes in stacking direction X. That is, skeleton part 100 can flexibly cope with a change in number of batteries 12.

Further, battery pack 1 includes cooling part 200. Cooling part 200 is housed in housing 2. With such a configuration, the lowering of performance of battery 12 attributed to the increase in temperature can be suppressed. At least a portion of refrigerant pipe 204 of cooling part 200 is housed in internal space 102a of stem 102. With such a configuration, battery pack 1 can be further miniaturized. It is possible to omit a space required for installation of refrigerant pipe 204 and hence, such a configuration can contribute to more efficient arrangement of batteries 12.

Housing 2 includes container portion 2a having the opening, and lid portion 2b which closes the opening of container portion 2a. A fixing portion to be fixed to container portion 2a is provided to both ends of stem 102 and to distal ends of the plurality of branch portions 104 respectively. With such a configuration, housing 2 can be reinforced with more certainty.

The present invention is not limited to the above-described exemplary embodiment. Modifications such as various design changes can be added to the exemplary embodiment based on knowledge of a person skilled in the art. The modified exemplary embodiment also falls within the scope of the present invention. New exemplary embodiments obtained by modifying the above-mentioned exemplary embodiment have effects of combined exemplary embodiments and effects of the modified exemplary embodiments respectively.

The number of batteries 12 which battery stack 10 includes, and a number of branch portions 104 which skeleton part 100 includes are not particularly limited. Further, exterior can 14 may be covered with an insulating sheet such as a shrink tube. With the insulating sheet covering a surface of exterior can 14, the occurrence of short-circuiting between neighboring batteries 12 and between battery 12 and skeleton part 100 can be suppressed. Battery stacks 10 and cooling plate 202 may be thermally connected to each other by way of any heat conductive members.

Any combinations of the above-described constitutional elements, and converted expressions of the present invention in method, apparatus, system and the like are also effective as aspects of the present invention.

The invention claimed is:

1. A battery pack comprising:
a battery stack having a plurality of stacked batteries in a stacking direction;
a housing that houses the battery stack; and
a skeleton part that is housed in the housing and reinforces the housing, wherein:
the skeleton part includes:
a stem extending in a first direction;
a plurality of branch portions protruding from the stem and being arranged in a row in the first direction; and
a plurality of housing spaces, each of the housing spaces being defined by a pair of branch portions disposed adjacently to each other and housing the battery stack,
the stem and the plurality of branch portions are fixed to the housing,
the battery pack further comprises an end plate,
in the stacking direction, the battery stack is located between the stem and the end plate,
the end plate is connected to the plurality of branch portions and fixes the battery stack,
the end plate has a plurality of body portions corresponding to the plurality of housing spaces, and a connecting portion that connects adjacent two body portions, which are disposed adjacently to each other, among the plurality of body portions, and
the connecting portion is deformable according to relative displacement between the adjacent two body portions.

2. The battery pack according to claim 1, wherein
each of the branch portions has a hollow structure, and has a rod member extending in an extending direction of the branch portion in an inside of the branch portion, and
the end plate is fixed to the rod member.

3. The battery pack according to claim 1, wherein the stem has a hollow structure, and a member used for the battery pack is housed in the stem.

4. The battery pack according to claim 1, wherein the stem has a hollow structure, and constitutes an exhaust duct for a gas discharged from the batteries.

5. The battery pack according to claim 4, wherein each of the branch portions has a hollow structure, and constitutes an exhaust duct for a gas discharged from the batteries.

6. The battery pack according to claim 1, further comprising a cooling part for cooling the battery stack.

7. The battery pack according to claim 6, wherein
the stem has a hollow structure,
the cooling part has a refrigerant pipe, and
at least a portion of the refrigerant pipe is housed in the stem.

8. The battery pack according to claim 1, wherein
the housing includes a container portion having an opening, and a lid portion that closes the opening of the container portion, and
the stem and the plurality of branch portions each have a fixing portion fixed to the container portion.

* * * * *